No. 790,005. Patented May 16, 1905.

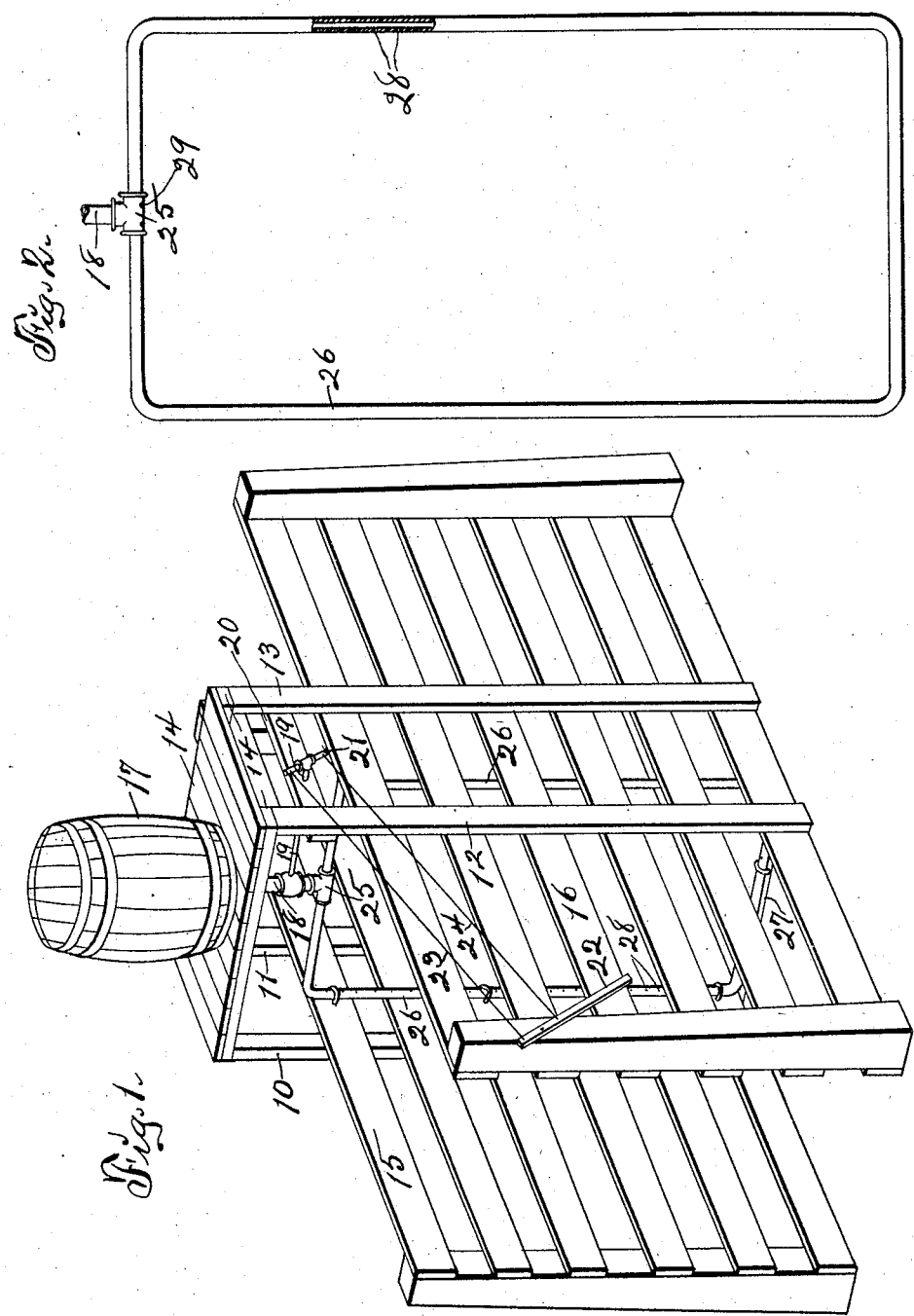

UNITED STATES PATENT OFFICE.

IRA D. SMELSER, OF KELLERTON, IOWA.

LIVE-STOCK-SPRAYING DEVICE.

SPECIFICATION forming part of Letters Patent No. 790,005, dated May 16, 1905.

Application filed January 13, 1905. Serial No. 240,957.

*To all whom it may concern:*

Be it known that I, IRA D. SMELSER, a citizen of the United States of America, and a resident of Kellerton, Ringgold county, Iowa, have invented a new and useful Live-Stock-Spraying Device, of which the following is a specification.

The object of this invention is to provide improved means for spraying live stock—such as cattle, horses, mules, hogs, sheep, and goats—for the purpose of killing vermin on said live stock or applying to the hair, wool, or fur thereof an insectide or antiseptic solution or disinfectant.

A further object of this invention is to simplify and cheapen the construction of an apparatus for the purpose above set forth.

My invention consists in the construction, arrangement, and combination of elements hereinafter set forth, pointed out in my claims, and illustrated by the accompanying drawings, in which—

Figure 1 is a perspective illustrating my complete device. Fig. 2 is a detail view of the spraying-tube, partly in section.

In the construction of the device as shown the numerals 10 11 12 13 designate vertical posts connected at their upper ends by cross-bars 14. Fences, walls, or frames 15 16 are mounted opposite each other and are fixed to the posts 10, 11, 12, and 13, respectively, to form sides to a chute. The fences 15 16 may be parallel with each other, as shown, or may converge slightly toward the forward end. A receptacle 17, such as a barrel, is mounted on and supported by the cross-bars 14, and a discharge-pipe 18 leads downward from said receptacle. A valve is mounted in the pipe 18 and controls the flow of fluid therethrough. A stem 19 of the valve extends laterally to a point of support on a bar 20, connecting the posts 12 13, and a cross-head 21 is mounted on the outer end portion of said stem. A lever 22 is fulcrumed on the fence 16 and is connected by rods or wires 23 24 on opposite sides of its fulcrum to opposite ends of the cross-head 21. A T 25 is mounted on the lower end of the pipe 18 and has its alining ports extending laterally toward the fences 15 16. A pipe or tube 26, preferably of smaller diameter than the pipe 18, is bent at two points near its center and extended in parallel planes and is bent again at two points and has its end portions extended to and communicating with the alining ports of the T 25. The middle portion of the tube 26 extends horizontally near the ground from the fence 15 to the fence 16 and may be fixed to and supported by the cross-bar 27, connected to the bases of said fences. The side portions of the tube 26 extend vertically along and are fixed to the fences 15 16, and the end portions of said tube and the T 25 cross the space between the fences above the extreme height of an animal to be treated by this device. A tube 26 is provided with a plurality of discharge-ports or jet-openings 28 at the innermost points of its periphery, and the T 25 also is provided with ports or jet-openings 29 at the lowermost points of its periphery. The jet openings or ports 28 29 are very minute and arranged, preferably, at uniform distances of separation.

In the practical use of this device an animal to be sprayed is driven through the chute formed by the fences 15 16 and is caused to pass through the loop formed by the tube 26 and T 25. While the animal is passing through the loop formed by the tube 26 and T 25 an operator manipulates the lever 22 to open the valve in the pipe 18 and permit a liquid solution to flow from the receptacle 17 and be discharged through the ports or jet-openings 28 29 against the hair or fur of the animal. The animals may be driven through in a continuous stream and the solution be sprayed constantly upon them or the operator may manipulate the lever 22 and cut on and off the flow of liquid as each animal enters the loop.

I do not claim any specific solution, but prefer to use this device for spraying any desired solution on live stock.

I claim as my invention—

1. A live-stock-spraying device, comprising a chute, a perforated loop embracing the passage through said chute, a receptacle adapted to supply liquid to said perforated loop and a valve controlling the flow of liquid from said receptacle.

2. In a live-stock-spraying device, a chute, a loop embracing the passage through said chute, said loop perforated on its interior surface, a receptacle mounted above the chute, and a valve-controlled pipe communicating between said receptacle and loop.

3. In a live-stock-spraying device, a chute, a looped tube embracing the passage through said chute and perforated interiorly for the discharge of liquid across said chute, a pipe communicating with the upper portion of said tube, a receptacle communicating with the upper portion of said pipe, a valve in said pipe, a lever fulcrumed on said chute and operative connections between said lever and valve.

4. A live-stock-spraying device, including a chute for the passage of animals, a single spraying-tube dominating the passage through said chute and means for supplying spraying fluid to said tube.

5. A live-stock-spraying device, comprising a chute, spraying devices for directing fluid against animals during their passage through said chute and a receptacle from which fluid may flow by gravity to said spraying devices.

Signed by me at Kellerton, Ringgold county, Iowa, this 6th day of December, 1904.

IRA D. SMELSER.

Witnesses:
R. EMERSON,
JEANNETTE BLAIR.